United States Patent [19]

Makino et al.

[11] 4,378,400

[45] Mar. 29, 1983

[54] GAS SEPARATING MATERIAL

[75] Inventors: Hiroshi Makino; Yoshihiro Kusuki; Takashi Harada; Hiroshi Shimazaki, all of Ichihara, Japan

[73] Assignee: Ube Industries, Ltd., Yamaguchi, Japan

[21] Appl. No.: 278,071

[22] Filed: Jun. 29, 1981

[30] Foreign Application Priority Data

Jul. 1, 1980 [JP] Japan ................... 55-88529

[51] Int. Cl.³ ............................... B32B 9/02
[52] U.S. Cl. ................... 428/220; 210/500.2; 55/16; 55/158; 428/473.5; 528/353; 528/188; 528/220; 528/352
[58] Field of Search ............... 210/500.2; 55/16, 158; 428/473.5, 220; 528/353, 220, 352, 188

[56] References Cited

U.S. PATENT DOCUMENTS 3,899,309  8/1975  Hoehn et al. ................... 528/353

Primary Examiner—Marion McCamish
Assistant Examiner—E. Rollins Buffalow
Attorney, Agent, or Firm—Burgess, Ryan and Wayne

[57] ABSTRACT

A gas separating material having excellent heat and chemical resistance, mechanical strength and gas-separating function, comprises a gas separating layer consisting of at least one dense film having a thickness of from 0.1 to 20 microns and comprising at least one aromatic imide polymer which comprises at least 80 molar % of at least one type of recurring unit of the formula (I):

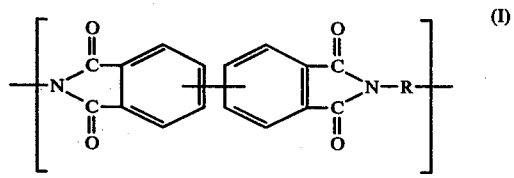

wherein R represents a divalent aromatic radical.

5 Claims, No Drawings

GAS SEPARATING MATERIAL

FIELD OF THE INVENTION

The present invention relates to a gas separating material. More particularly, the present invention relates to a gas separating material in which a gas separating layer is composed of at least one dense film consisting essentially of a biphenyltetracarboxylic acid-type aromatic polyimide.

BACKGROUND OF THE INVENTION

Only one aromatic polyimide dense film which has been hitherto known to be usable as a gas-separating film, is a dense film prepared from pyromellitic acid and an aromatic diamine. However, this known aromatic polyimide dense film is unsatisfactory in its gas-separating property, because the dense film exhibits a maximum ratio of gas permeability coefficient of hydrogen gas ($PH_2$) to that of carbon monoxide gas (PCO) of about 75 and a maximum ratio of gas permeability coefficient of oxygen gas ($PO_2$) to that of nitrogen gas ($PN_2$) of about 4.5.

Generally, the aromatic polyimide has an excellent heat-resisting property, a superior chemical-resisting property and satisfactory mechanical properties. Accordingly, it is strongly desired by industry to provide an aromatic polyimide film having a satisfactory gas-separating property and excellent durability at an elevated temperature.

SUMMARY OF THE INVENTION

An object of the present invention is to provide a gas separating material having excellent heat resistance, chemical resistance and mechanical strength.

Another object of the present invention is to provide a gas separating material having an excellent capability of separating hydrogen gas from carbon monoxide gas and of separating oxygen gas from nitrogen gas.

A further object of the present invention is to provide a gas separating material having an excellent durability at an elevated temperature.

The above-mentioned objects can be attained by the gas separating material of the present invention which comprises a gas separating layer consisting of at least one dense film having a thickness of from 0.1 to 20 microns and comprising at least one aromatic imide polymer which comprises at least 80 molar % of at least one type of recurring unit of the formula (I):

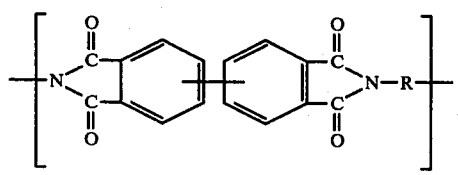

wherein R represents a divalent aromatic radical.

DETAILED DESCRIPTION OF THE INVENTION

The dense film used in the gas separating material of the present invention exhibits a satisfactory ratio of gas permeability coefficient of hydrogen gas ($PH_2$) to that of carbon monoxide gas (PCO) of 65 or more, usually, 70 to 200, and an excellent ratio of gas permeability coefficient of oxygen gas ($PO_2$) to that of nitrogen gas ($PN_2$) of 7.0 or more, usually, 7.2 to 20. Accordingly, due to the excellent gas separating property of the gas separating material of the present invention, this is useful for separating various gases from one another and for concentrating various gases.

The dense film comprises at least one aromatic imide polymer comprising at least 80 molar %, preferably, at least 90 molar %, of at least one type of recurring unit of the formula (I):

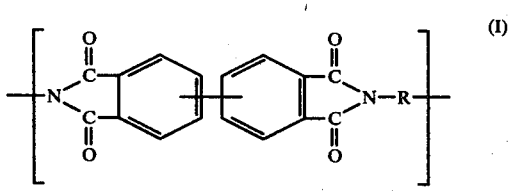

wherein R represents a divalent aromatic radical. The recurring unit of the formula (I) involves those of the formulae (II) and (III), preferably, the formula (II):

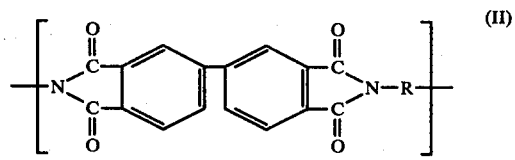

and

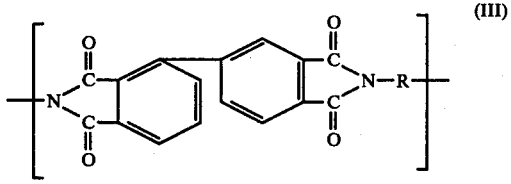

The divalent aromatic radical represented by R in the formula (I) is preferably selected from the group consisting of those of the formulae (IV) and (V):

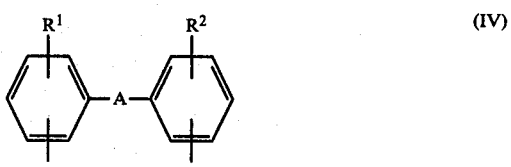

wherein $R^1$ and $R^2$ respectively represent, independently from each other, a member selected from the group consisting of a hydrogen atom, lower alkyl radical having 1 to 3 carbon atoms and lower alkoxy radicals having 1 to 3 carbon atoms, and A represents a divalent bond selected from the group consisting of —O—, —S—, —CO—, —SO$_2$—, —SO—, —CH$_2$— and —C(CH$_3$)$_2$—, and;

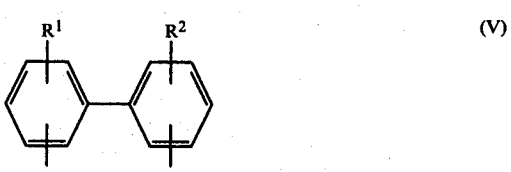

wherein $R^1$ and $R^2$ are as defined above.

The aromatic imide polymer may comprise at least one type of recurring unit of the formula (I) in which R represents a divalent aromatic radical of the formula (IV) or (V) and at least one type of recurring unit of the formula (I) in which R represents a divalent aromatic radical selected from the group consisting of those of the formulae (VI) to (IX):

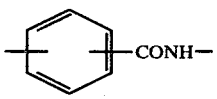 (VI)

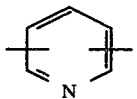 (VII)

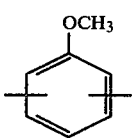 (VIII)

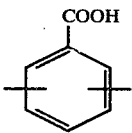 (IX)

and

 (X)

The dense film may be prepared in such a manner that at least one aromatic polyimide as defined above is dissolved in a concentration of from 3 to 30% by weight in a phenol type solvent, for example, phenol, cresols, xylenols, halogenated phenols to prepare a dope solution, the dope solution is coated or spread on a surface of a substrate to form a film of the dope solution, the dope solution film is dried by gradually evaporating the solvent, and, finally, the dried aromatic polyimide film is completely dried at a temperature of from 150° to 400° C., preferably, from 170° to 350° C.

In the case where the dense film is prepared by the above-mentioned process, it is preferable that the aromatic imide polymer having 80 molar % or more of the recurring unit of the formula (I) has a logarithmic (inherent) viscosity of from 0.3 to 7, more preferably, from 0.4 to 5, determined in a concentration of 0.5 g per 100 ml of a solvent consisting of 4 parts by volume of p-chlorophenol and one part by volume of o-chlorophenol at a temperature of 30° C.

In the above-mentioned case, the aromatic imide polymer may be one which has been prepared by the polymerization and the imide ring cyclization of a tetracarboxylic acid component comprising 80 molar %, or more preferably, 90 molar % or more, of biphenyl tetracarboxylic acid of the formula (XI):

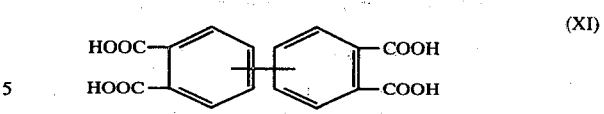 (XI)

or its anhydride, salt or ester, with an aromatic diamine component consisting essentially of at least one member selected from the group consisting of diamine compounds of the formula (XII):

$$H_2N-R-NH_2 \quad (XII)$$

wherein R is the same as that defined above.

The biphenyl tetracarboxylic acid of the formula (XI) is selected from 2,3,3',4'-biphenyl tetracarboxylic acid and 3,3',4,4'-biphenyl tetracarboxylic acid. Each of the above-mentioned biphenyl tetracarboxylic acids may be in the form of its free acid, anhydride, salt or ester, preferably, anhydride.

The tetracarboxylic acid component may contain 20 molar % or less, preferably, 10 molar % or less, of at least one additional tetracarboxylic acid selected from the group consisting of pyromellitic acid, 3,3',4,4'-benzophenone tetracarboxylic acid, 2,2-bis(3,4-dicarboxyphenyl)propane, bis(3,4-dicarboxyphenyl)sulfone, bis(3,4-dicarboxyphenyl)ether, bis(3,4-dicarboxyphenyl)thioether, butane tetracarboxylic acid, and anhydrides, salts and esters of the above-mentioned acids.

The aromatic diamine of the formula (XII) can be selected from the group consisting of those of the formulae (XIII) to (XIV):

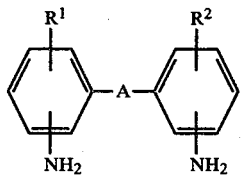 (XIII)

wherein $R^1$ and $R^2$ respectively represent, independently from each other, a member selected from the group consisting of a hydrogen atom, lower alkyl radical having 1 to 3 carbon atoms, and lower alkoxy radical having 1 to 3 carbon atoms, and A represents a divalent bond selected from the group consisting of —O—, —S—, —CO—, —SO$_2$—, —SO—, —CH$_2$— and —C(CH$_3$)$_2$—, and;

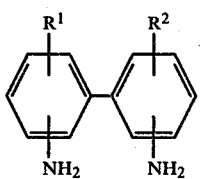 (XIV)

wherein $R^1$ and $R^2$ are as defined above.

The aromatic diamine component may comprise at least one aromatic diamine selected from the group consisting of those of the formulae (XIII) and (XIV) and at least one other aromatic diamine selected from the group consisting of those of the formulae (XV) to (XIX):

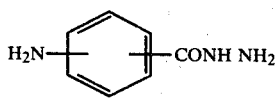 (XV)

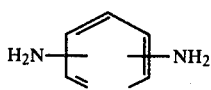 (XVI)

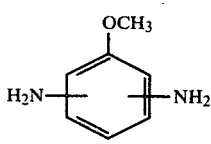 (XVII)

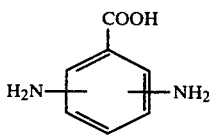 (XVIII)

and

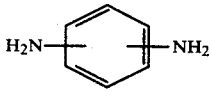 (XIX)

The aromatic diamine compound of the formula (XIII) may be selected from the group consisting of diamino-diphenyl ether compounds, for example, 4,4'-diaminodiphenyl ether, 3,3'-dimethyl-4,4'-diaminodiphenyl ether, 3,3'-diaminodiphenyl ether and 3,3'-diethoxy-4,4'-diaminodiphenyl ether; diaminodiphenyl thioether compounds, for example, 4,4'-diaminodiphenyl thioether, 3,3'-dimethyl-4,4'-diaminodiphenyl-thioether, 3,3'-diethoxy-4,4'-diaminodiphenyl-thioether, and, 3,3'-diaminodiphenyl thioether; diaminobenzophenone compounds, for example, 4,4'-diaminobenzophenone and 3,3'-dimethyl-4,4'-diaminobenzophenone; diaminodiphenyl methane compounds, for example, 4,4'-diaminodiphenyl methane, 3,3'-diaminodiphenyl methane, 3,3'-dimethoxy-4,4'-diaminodiphenyl methane and 3,3'-dimethyl-4,4'-diaminodiphenyl methane; diaminodiphenyl propane compounds, for example, 2,2-bis(4'-aminophenyl)propane and 2,2-bis(3'-aminophenyl)propane; 4,4'-diaminodiphenyl sulfoxide, and; diaminodiphenyl sulfons, for example, 4,4'-diaminodiphenyl sulfone; 3,3'-diaminodiphenyl sulfone, and 3,4'-diaminodiphenyl sulfone.

The aromatic diamine compound of the formula (XIV) includes benzidine, 3,3'-dimethyl benzidine, 3,3'-dimethoxybenzidine and 3,3'-diaminobiphenyl.

The aromatic diamine compound of the formula (XV) may be either 4-aminobenzhydrazide or 3-aminobenzhydrazide.

The aromatic diamine compound of the formula (XVI) may be either 2,6-diaminopyridine or 2,5-diaminopyridine.

The aromatic diamine compound of the formula (XVII) may be either 4-methoxy-1,3-diaminobenzene or 3-methoxy-1,4-diaminobenzene.

The aromatic diamine compound of the formula (XVIII) may be either 3,5-diaminobenzoic acid or 2,4-diaminobenzoic acid.

The aromatic diamine compound of the formula (XIX) may be selected from o-, p- and m-phenylene diamines.

Generally, the aromatic diamine compound of the formula (XII) is selected preferably from the group consisting of 4,4'-diaminodiphenyl ether, 4,4'-diaminodiphenyl thioether, 4,4'-diaminodiphenyl methane, benzidine, 3,3'-dimethoxybenzidine and 3,3'-dimethylbenzidine.

The aromatic diamine component may consist of 4,4'-diaminodiphenyl ether or 3,3'-dimethoxybenzidine alone, or a mixture of 40 molar % or more, preferably, 50 molar % or more, of 4,4'-diaminodiphenyl ether or 3,3'-dimethoxybenzidine with the balance consisting of at least one other aromatic diamine selected from the group consisting of p-phenylene diamine, m-phenylene diamine, 4,4'-diaminodiphenyl thioether, 4,4'-diaminodiphenyl methane, 3,3'-dimethyl-4,4'-diaminodiphenyl ether, 3,3'-dimethylbenzidine, benzidine, benzidine sulfone, 4,4'-diaminodiphenyl sulfone, 3,3'-diaminodiphenyl sulfone, and 3,5-diaminobenzoic acid.

The polymerization and the imide ring cyclization of the tetracarboxylic acid component with the aromatic diamine component can be carried out by any conventional process. In a very preferable process for producing an imide polymer, a biphenyl tetracarboxylic acid component an aromatic diamine component, which are in approximately equal molar amounts to each other, are dissolved in an organic polar solvent, for example, N-methylpyrrolidone, pyridine, N,N-dimethylacetamide, N,N-dimethylformamide, dimethyl sulfoxide and tetramethyl urea, the solution is heated at a temperature of 80° C. or less, preferably 0° to 60° C., so as to allow the biphenyl tetracarboxylic acid component and the aromatic diamine component to be polymerized with each other to provide a polyamic acid having a logarithmic viscosity of 0.3 or more, preferably, 0.7 to 7.0, determined at a concentration of 0.5 g per 100 ml of N-methyl pyrrolidone at a temperature of 30° C.; the solution of the polyamic acid in the organic polar solvent, which solution can be the above-mentioned polymerization reaction mixture itself, is subjected to an imidization reaction at a temperature of from 5° to 150° C. by using an imidization accelerator consisting of at least one member selected from trimethyl amine, triethyl amine, pyridine, acetic anhydride, thionylchloride and carbodiimide, or at a temperature of from 100° to 300° C., preferably, from 120° to 250° C., without using the imidization accelerator, to provide an imide polymer having a degree of imidization of 90% or more, and; the resultant imide polymer is isolated from the reaction mixture by means of precipitation.

In another process for producing the aromatic imide polymer, the solution of the polyamic acid in the organic polar solvent, which solution has been prepared by the above-mentioned process and which has a logarithmic viscosity of 0.5 or more, determined at a concentration of 0.5 g per 100 ml of N-methylpyrrolidone at a temperature of 30° C., is mixed with a large amount of a precipitating agent consisting of acetone or an alcohol so as to allow the polyamic acid to precipitate from the solution, or the solution of the polyamic acid is mixed with the precipitating agent after evaporating the organic polar solvent from the solution so as to allow the polyamic acid to precipitate from the reaction mixture; the polyamic acid precipitate is isolated from the reaction mixture, and; the isolated polyamic acid is heated at a temperature of from 150° to 300° C., preferably, from 160° to 250° C., until the degree of imidization of the resultant imide polymer reaches 90% or more.

In still another process for producing the imide polymer, a biphenyltetracarboxylic acid component consisting of 2,3,3',4'- and/or 3,3',4,4'-biphenyltetracarboxylic acid and an aromatic diamine component consisting of at least one diamine compound of the formula (XII) are polymerized and imide ring cyclized in single step in a solvent consisting of at least one phenol compound in the state of a liquid or melt, at a temperature of from 120° to 400° C., preferably, from 150° to 300° C. This imide polymer-producing process is most preferable for the present invention, because the resultant solution (dope) of the imide polymer in the phenol compound from this imide polymer-producing process can be directly utilized for the process of the present invention.

When the dense film is prepared, the aromatic imide polymer is dissolved in a phenol type solvent to provide a dope solution.

The phenol type solvent consists of at least one phenol compound preferably having a melting point not exceeding 100° C., more preferably, not exceeding 80° C. It is also preferable that the phenol compound have a boiling point not exceeding 300° C., more preferably, not exceeding 280° C., under atmospheric pressure. For example, the phenol compound may be selected from the group consisting of phenol, o-, m-, and p- cresols, 3,5-xylenol, 1,4-xylenol, carvacrol, thimol and halogenated phenol compounds.

The halogenated phenol compounds are preferable of the formulae:

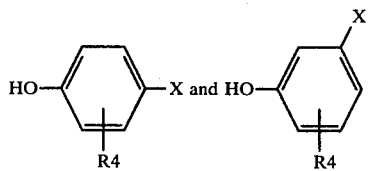

wherein R4 represents a member selected from the group consisting of a hydrogen atom, and alkyl radicals having 1 to 3 carbon atoms, for example, methyl, ethyl and propyl radicals, and X represents a halogen atom, such as a chlorine, bromine, fluorine or iodine atom.

The preferred halogenated phenol compounds are 3-chlorophenol, 4-chlorophenol, 3-bromophenol, 4-bromophenol, 2-chloro-4-hydroxytoluene, 2-chloro-5-hydroxytoluene, 3-chloro-6-hydroxytoluene, 4-chloro-2-hydroxytoluene, 2-bromo-4-hydroxytoluene, 2-bromo-5-hydroxytoluene, 3-bromo-5-hydroxytoluene, 3-bromo-6-hydroxytoluene and 4-bromo-2-hydroxytoluene.

In another method for producing the dense film, an aromatic polyamic acid which comprises at least one type of the recurring unit of the formula (I) and at least 30 molar %, preferably at least 40 molar %, of at least one type of recurring unit of the formula (XX):

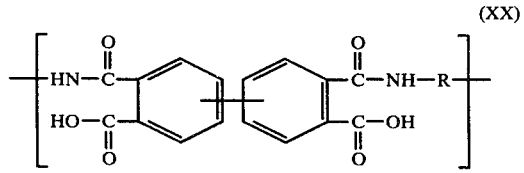

wherein R is as defined hereinbefore, the sum of the amount of the recurring units of the formulae (I) and (XX) being 80 molar % or more, preferably, 90 molar % or more, is dissolved in a concentration of from about 3 to about 30% by weight in an organic polar solvent.

The resultant dope solution is coated or spread on a surface of a substrate at a temperature of from about 10° to about 100° C. The resultant film of the dope solution is dried by gradually evaporating the solvent while gradually elevating the temperature of the dope solution film. Finally, the dried solid film is heated at a temperature of from 150° to 400° C., preferably, from 170° to 350° C. to completely dry it. This procedure causes the amide-acid structure in the recurring unit of the formula (XX) to be converted into an imide cyclic structure.

In the case where the dense film is prepared by the above-mentioned method, it is preferable that the aromatic polyamic acid has a logarithmic (inherent) viscosity of from 0.3 to 7, more preferably, from 0.4 to 5, determined at a concentration of 0.5 g per 100 ml of a solvent consisting of N-methylpyrrolidone at a temperature of 30° C.

Also, it is preferable that the organic polar solvent for the aromatic polyamic acid, consists of at least one polar compound selected from the group consisting of N-methylpyrrolidone, N,N-dimethyl acetamide, formamide, dimethyl sulfoxide and tetramethyl urea.

The above-mentioned type of aromatic polyamic acid can be prepared by polymerizing the above-mentioned biphenyltetracarboxylic acid component with the above-mentioned aromatic diamine in an organic polar solvent at a temperature of about 150° C. or less, preferably, 100° or less, more preferably, about 60° C. or less, in any conventional polymerization method.

In the above-mentioned two different methods for producing the dense film, the final complete drying procedure should be carried out at a temperature lower than the melting point of the aromatic imide polymer dense film. This final drying procedure is carried out most preferably at a temperature of from 180° to 350° C. for from 30 minutes to 10 hours. This final drying procedure is effective for remarkably enhancing the gas separating property of the dense film.

In the preparation of the dense film, the solution of the polymer is coated or spread on a smooth surface of the substrate. The substrate may be a glass plate, a copper plate having a polished smooth surface thereof or a metal roll or belt having a polished smooth peripheral surface thereof. After the drying procedure, the resultant film of the aromatic imide polymer is peeled off from the surface of the substrate to provide a thin dense film of the aromatic imide polymer. The resultant dense film can be used as a gas separating film or may be laminated on a porous material to form a composite gas separating material.

When the dope solution is coated or spread on a surface of a porous substrate and the resultant dope solution film is dried, the resultant product composed of the dense film laminated on the porous substrate can be used as a gas separating material.

That is, the gas separating material of the present invention may be composed of at least one dense film alone. Otherwise, the gas separating material may be composed of at least one dense film laminated on a porous material. Also, the gas separating material of the present invention may be in the form of a flat sheet or in the form of a tube or hollow fiber.

The dense film of the present invention has a thickness in a range of from 0.1 to 20 microns, preferably, from 0.2 to 15 microns, depending on the use of the gas separating material. If the thickness is less than 0.1 microns, the dense film exhibits a poor gas-separating property. Also, it is known that the larger the thickness of the gas separating layer, the smaller the gas permeating rate of the layer. When the thickness is more than 20 microns, the dense film exhibits a remarkably reduced gas permeating rate and is no good for practical use.

The gas separating material of the present invention has many various uses, for example, in separating and concentrating oxygen gas from air or in increasing the concentration of hydrogen gas in a hydrogen-carbon monoxide gas mixture, at an elevated temperature.

The specific examples presented below will serve to more fully elaborate how the present invention can be practically used. However, it should be understood that the examples are only illustrative and in no way limit the present invention.

In the following examples, the logarithmic viscosity of imide polymers or polyamic acid was determined by the following method.

In the case of a polyamic acid, the polymer is dissolved at a concentration of 0.5 g in 100 ml of N-methyl-2-pyrrolidone. The viscosity of the solution was measured at a temperature of 30° C.

In the case of polyimide, the polymer was dissolved at a concentration of 0.5 g in 100 ml of a mixture of 4 parts by volume of p-chlorophenol and 1 part by volume of o-chlorophenol. The viscosity of the solution was measured at a temperature of 30° C.

The measured value of the viscosity of the solution was converted into a logarithmic (inherent) viscosity of the polymer in accordance with the following equation.

$$\text{Logarithmic viscosity } [\psi] = \frac{\text{natural logarithm}\left(\frac{\text{viscosity of solution}}{\text{viscosity of solvent}}\right)}{\text{Concentration of polymer in solution}}$$

The degree of imidization of the polyimide was determined by the following method.

An imide polymer in the form of fine particles was subjected to an infrared-ray absorption spectrum analysis. The amount of the imide structure was determined from heights of absorption peaks at 1780 cm$^{-1}$ and 1720 cm$^{-1}$, and the amount of the amide structure was determined from height of absorption peaks at 3300 cm$^{-1}$ and 1640 cm$^{-1}$. Also, the permeability coefficient of the gas separating material was calculated in accordance with the equation:

$$\text{Permeability coefficient} = \frac{X \times Th}{A \times T \times D} \text{ (cm}^3 \cdot \text{cm/cm}^2 \cdot \text{sec} \cdot \text{cmHg)}$$

wherein X represents an amount in cm$^3$ STP of gas passed through the film, Th represents a thickness in cm of the film, A represents an area in cm$^2$ of the film through which the gas passed, T represents a time in seconds during which the gas passed through the film, and D represents a difference between the pressures in cmHg of the gas before and after it passed through the film.

EXAMPLE 1

A separating flask with a stirrer and a conduit for introducing thereinto nitrogen gas, was charged with a mixture of 40 millimoles of 3,3',4,4'-biphenyl tetracarboxylic dianhydride, 40 millimoles of 4,4'-diaminodiphenyl ether and 170 ml of dimethyl acetamide. The mixture was subjected to a polymerization procedure at a temperature of 20° C. for five hours while flowing nitrogen gas through the conduit and the flask, to prepare polyamic acid. The resultant polymerization mixture was cooled to a temperature of 10° C. or less and, then, mixed with 100 ml of dimethyl acetamide, 240 millimoles of acetic anhydride and 240 millimoles of pyridine. The mixture was homogenized by fully stirring it. Thereafter, the mixture was gradually heated to and maintained at a temperature of about 30° C. for about 20 minutes while allowing the resultant incompletely imidized polymer to precipitate in the form of fine particles in the polymerization mixture. The polymerization mixture was heated to and maintained at a temperature of from 70° to 80° C. for 30 minutes or more to complete the imidization reaction.

The polymerization mixture containing the imide polymer particles was mixed into a large amount of methyl alcohol. The mixture was filtered to separate the imide polymer particles. The imide polymer particles were washed with methyl alcohol and, then, dried under a reduced pressure, to prepare an imide polymer powder.

The imide polymer powder exhibited a degree of imidization of 90% or more and a logarithmic viscosity of 1.90.

A separating flask equipped with a stirrer was charged with a mixture of 10 g of the imide polymer powder and 90 g of p-chlorophenol. The mixture was heated to a temperature of about 100° C. while stirring it, to prepare a homogeneous solution of the imide polymer, the solution was refined by filtering and by degassing it, to prepare a dope solution.

The dope solution was spread on a surface of a glass plate placed horizontally to form a thin film of the dope solution having a uniform thickness. The dope solution film was maintained at a temperature of about 100° C. in a nitrogen gas atmosphere for 2 hours, to gradually evaporate the solvent, and, then the resultant solid film on the glass plate was completely dried at a temperature of 200° C. for 5 hours. The resultant imide polymer dense film had a thickness of 10 microns.

The resultant imide polymer dense film was subjected to gas permeating tests for hydrogen, carbon monoxide, oxygen and nitrogen gases.

The results of the tests are indicated in Table 1.

TABLE 1

| Gas permeability coefficient (cm$^3 \cdot$ cm/cm$^2 \cdot$ sec $\cdot$ cmHg) | | Gas permeability coefficient ratio | |
|---|---|---|---|
| PH$_2$ | 9.1 × 10$^{-10}$ | PH$_2$/PCO | 76 |
| PCO | 1.2 × 10$^{-11}$ | | |
| PO$_2$ | 4.7 × 10$^{-11}$ | PO$_2$/PN$_2$ | 11 |
| PN$_2$ | 4.3 × 10$^{-12}$ | | |

The dense film had excellent PH$_2$/PCO and PO$_2$/PN$_2$ ratio.

EXAMPLE 2

The same separating flask as that described in Example 1 was charged with a mixture of 40 millimoles of 3,3′,4,4′-biphenyltetracarboxylic dianhydride, 40 millimoles of 4,4′-diaminodiphenyl ether and 163 ml of a solvent consisting of N-methyl pyrrolidone. The mixture was subjected to a polymerization procedure at a temperature of 25° C. for five hours. A solution containing 10% by weight of polyamic acid was obtained.

The polyamic acid in the solution exhibited a degree of imidization of 10% or less and a logarithmic viscosity of 2.41. The polyamic acid solution was refined by filtering and degassing it, to prepare a dope solution.

The dope solution was spread on a horizontal surface of a glass plate to form a film of the dope solution, having a uniform thickness. The dope solution film was allowed to stand in a nitrogen gas atmosphere at a temperature of about 60° C. for two hours, to gradually evaporate the solvent. The resultant solid film was completely dried at a temperature of 240° C. for 5 hours to complete the imidization reaction. The resultant imide polymer dense film had a thickness of 5 microns.

The imide polymer dense film was subjected to gas permeating tests on hydrogen, carbon monoxide, oxygen and nitrogen gases. The results are indicated in Table 2.

TABLE 2

| Gas permeability coefficient ($cm^3 \cdot cm/cm^2 \cdot sec \cdot cmHg$) | | Gas permeability coefficient ratio | |
|---|---|---|---|
| $PH_2$ | $2.0 \times 10^{-10}$ | $PH_2/PCO$ | 92 |
| PCO | $2.2 \times 10^{-12}$ | | |
| $PO_2$ | $9.7 \times 10^{-12}$ | $PO_2/PN_2$ | 16 |
| $PN_2$ | $6.1 \times 10^{-13}$ | | |

The dense film had excellent $PH_2/PCO$ and $PO_2/PH_2$ ratios.

EXAMPLE 3

The same procedures for producing polyamic acid solution as described in Example 2 were carried out, except that 4,4′-diaminodiphenyl ether was replaced by m-phenylene diamine.

The resultant polyamic acid exhibited a degree of imidization of 10% or less and a logarithmic viscosity of 2.15.

The same procedures for preparing a dense film as those described in Example 2 were carried out by using the polyamic acid solution.

The results of the gas permeating tests are indicated in Table 3.

TABLE 3

| Gas permeability coefficient ($cm^3 \cdot cm/cm^2 \cdot sec \cdot cmHg$) | | Gas permeability coefficient ratio | |
|---|---|---|---|
| $PH_2$ | $6.2 \times 10^{-10}$ | $PH_2/PCO$ | 70 |
| PCO | $8.9 \times 10^{-12}$ | | |
| $PO_2$ | $4.6 \times 10^{-11}$ | $PO_2/PN_2$ | 7.3 |
| $PN_2$ | $6.3 \times 10^{-12}$ | | |

The dense film exhibited satisfactory $PH_2/PCO$ and $PO_2/PH_2$ ratios.

COMPARATIVE EXAMPLE

The same procedures as those described in Example 2 for producing the polyamic acid solution were carried out, except that 3,3′,4,4′-biphenyltetracarboxylic dianhydride was replaced by pyromellitic acid.

The polyamic acid had a degree of imidization of 10% or less and a logarithmic viscosity of 1.98.

The same dense film-forming procedures and gas permeating tests as those described in Example 2 were carried out, by using the above-mentioned polyamic acid solution.

The results of the tests are indicated in Table 4.

TABLE 4

| Gas permeability coefficient ($cm^3 \cdot cm/cm^2 \cdot sec \cdot cmHg$) | | Gas permeability coefficient ratio | |
|---|---|---|---|
| $PH_2$ | $1.6 \times 10^{-9}$ | $PH_2/PCO$ | 57 |
| PCO | $2.8 \times 10^{-11}$ | | |
| $PO_2$ | $1.1 \times 10^{-10}$ | $PO_2/PN_2$ | 4.2 |
| $PN_2$ | $2.6 \times 10^{-11}$ | | |

The ratios $PH_2/PCO$ and $PO_2/PN_2$ of the comparative dense film were unsatisfactory.

EXAMPLE 4

The same seperating flask as that described in Example 1 was charged with 20 millimoles of 3,3′,4,4′-biphenyltetracarboxylic dianhydride, 20 millimoles of 3,3′-dimethoxybenzidine (O-DAN) and 90 g of p-chlorophenol. The mixture was subjected to a polymerization-imidization procedure in which the mixture was heated from room temperature to 180° C. within about 50 minutes while flowing nitrogen gas through the flask and stirring the mixture, and, then, the temperature of the mixture was maintained 180° C. for 7 hours so as to carry out the polymerization and imidization reactions in one single step procedure. A viscous imide polymer solution was obtained.

The imide polymer solution had a concentration of the polymer of about 10% by weight. The imide polymer had a logarithmic viscosity of 1.54 and a degree of imidization of 95% or more.

The imide polymer solution was used as a dope solution. The dope solution was uniformly spread on the surface of a glass plate by using a doctor blade to form a thin film of the dope solution having a thickness of 0.2 mm. The dope solution film was maintained at a temperature of about 100° C. for 3 hours, to gradually evaporate the solvent and, then, the resultant solid film was completely dried at a temperature of 200° C. for 3 hours. The resultant imide polymer dense film had a thickness of about 20 microns.

The resultant imide polymer dense film was subjected to gas permeating tests for hydrogen, carbon monoxide, oxygen and nitrogen gas.

The results of the tests are indicated in Table 5.

TABLE 5

| Gas permeability coefficient ($cm^3 \cdot cm/cm^2 \cdot sec \cdot cmHg$) | | Gas permeability coefficient ratio | |
|---|---|---|---|
| $PH_2$ | $8.0 \times 10^{-10}$ | $PH_2/PCO$ | 116 |
| PCO | $6.8 \times 10^{-12}$ | | |
| $PO_2$ | $4.1 \times 10^{-11}$ | $PO_2/PN_2$ | 11 |
| $PN_2$ | $3.7 \times 10^{-12}$ | | |

The above-mentioned dense film which had been dried at a temperature of 200° C., was further heat-treated at a temperature of 300° C. for 3 hours. The resultant heat-treated dense film exhibited the following gas permeating properties.

| | |
|---|---|
| PH$_2$ | 4.4 × 10$^{-10}$ |
| PCO | 3.7 × 10$^{-12}$ |
| PH$_2$/PCO | 117 |

EXAMPLE 5

A mixture of 20 millimoles of 3,3',4,4'-biphenyltetracarboxylic dianhydride, 12 millimoles of 3,3'-dimethoxybenzidine (o-DAN), 8 millimoles of 3,5-diaminobenzoic acid and 85 g of p-chlorophenol, was subjected to the same polymerization-imidization one single step procedure as that described in Example 4. A viscous imide polymer solution was obtained, which contained an imide polymer in a concentration of about 10% by weight. The imide polymer exhibited a logarithmic viscosity of 1.35 and a degree of imidization of 95% or more.

The imide polymer solution was used as a dope solution. The same procedure for producing a dense film as that described in Example 4 was carried out by using the dope solution. A dense film having a thickness of about 20 microns was obtained.

The dense film was subjected to the same gas permeating tests as those described in Example 4. The results are indicated in Table 6.

TABLE 6

| Gas permeability coefficient (cm$^3$ · cm/cm$^2$ · sec · cmHg) | | Gas permeability coefficient ratio | |
|---|---|---|---|
| PH$_2$ | 7.4 × 10$^{-10}$ | PH$_2$/PCO | 81 |
| PCO | 9.1 × 10$^{-12}$ | | |
| PO$_2$ | 2.9 × 10$^{-11}$ | PO$_2$/PN$_2$ | 12 |
| PN$_2$ | 2.4 × 10$^{-12}$ | | |

We claim:

1. A gas separating material comprising a gas separating layer consisting essentially of at least one dense film having a thickness of from 0.1 to 20 microns, said film comprising at least one aromatic imide polymer having at least 80 molar % of at least one type of recurring unit of the formula:

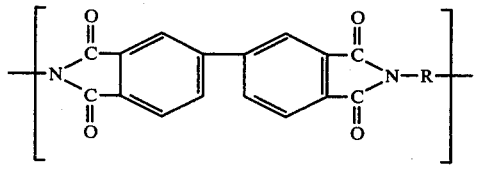

wherein R represents a divalent aromatic radical selected from the group consisting of those of the formulae (IV) and (V):

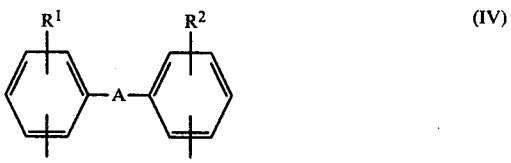

wherein R$^1$ and R$^2$ respectively represent, independently from each other, a member selected from the group consisting of a hydrogen atom, a lower alkyl radical having 1 to 3 carbon atoms and a lower alkoxy radical having 1 to 3 carbon atoms, and A represents a divalent bond selected from the group consisting of —O—, —S—, —CO—, —SO$_2$—, —SO—, —CH$_2$—, and —C(CH$_3$)$_2$—, and

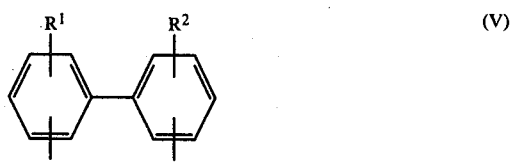

wherein R$^1$ and R$^2$ are as defined above, said dense film exhibiting a ratio of gas permeability coefficient of hydrogen gas to that of carbon monoxide gas (PH$_2$/PCO) of more than 65 and a ratio of gas permeability coefficient of oxygen gas to that of nitrogen gas (PO$_2$/PN$_2$) of from 7.0 to 20.

2. The gas separating material as claimed in claim 1, wherein the PH$_2$/PCO ratio is in the range of from 70 to 200 and the PO$_2$/PN$_2$ ratio is in the range of from 7.2 to 20.

3. The gas separating material as claimed in claim 2 wherein the PO$_2$/PN$_2$ ratio is in the range of from 11 to 16.

4. The gas separating material as claimed in claim 1 wherein R is

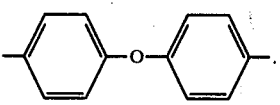

5. The gas separating material as claimed in claim 1 wherein R is of the formula (V) wherein R$^1$ and R$^2$ represent, independently from each other, a member selected from lower alkoxy radicals having 1 to 3 carbon atoms.

* * * * *